United States Patent
Garrison

(10) Patent No.: US 6,944,762 B1
(45) Date of Patent: Sep. 13, 2005

(54) SYSTEM AND METHOD FOR ENCRYPTING DATA MESSAGES

(75) Inventor: Greg B. Garrison, Woodstock, GA (US)

(73) Assignee: Harbor Payments Corporation, Atlanta, GA (US)

(*) Notice: Subject to any disclaimer, the term of this patent is extended or adjusted under 35 U.S.C. 154(b) by 0 days.

(21) Appl. No.: 09/389,819

(22) Filed: Sep. 3, 1999

(51) Int. Cl.[7] .............................................. H04L 9/00
(52) U.S. Cl. ..................... 713/160; 713/170; 713/171; 713/194; 713/168
(58) Field of Search ............................... 713/168, 170, 713/171, 194, 160

(56) References Cited

U.S. PATENT DOCUMENTS

| | | | |
|---|---|---|---|
| 4,405,829 A | 9/1983 | Rivest et al. ............ 178/22.1 |
| 4,649,233 A | 3/1987 | Bass et al. ............... 380/21 |
| 4,694,491 A | 9/1987 | Horne et al. ............. 380/20 |
| 4,731,840 A | 3/1988 | Mniszewski et al. ..... 380/21 |
| 4,782,529 A | 11/1988 | Shima ..................... 380/44 |
| 4,809,327 A | 2/1989 | Shima ..................... 380/44 |
| 4,891,785 A | 1/1990 | Donohoo .................. 364/900 |
| 5,081,678 A | 1/1992 | Kaufman et al. ........ 380/21 |
| 5,196,840 A | 3/1993 | Leith et al. ............. 340/825.3 |
| 5,202,922 A | 4/1993 | Iijima ...................... 380/45 |
| 5,315,658 A | 5/1994 | Micali ..................... 380/30 |
| 5,349,675 A | 9/1994 | Fitzgerald et al. ....... 395/800 |
| 5,416,917 A | 5/1995 | Adair et al. ............. 395/500 |
| 5,446,740 A | 8/1995 | Yien et al. .............. 370/110.1 |
| 5,455,862 A | 10/1995 | Hoskinson ............... 380/21 |
| 5,471,611 A | 11/1995 | McGregor ............... 395/600 |
| 5,564,106 A | 10/1996 | Puhl et al. ............... 380/21 |
| 5,581,749 A | 12/1996 | Hossain et al. .......... 395/600 |
| 5,664,173 A | 9/1997 | Fast ........................ 395/604 |
| 5,701,461 A | 12/1997 | Dalal et al. ............. 395/604 |
| 5,706,434 A | 1/1998 | Kremen et al. ......... 395/200.09 |
| 5,713,018 A | 1/1998 | Chan ...................... 395/610 |
| 5,737,592 A | 4/1998 | Nguyen et al. .......... 395/604 |
| 5,752,242 A | 5/1998 | Havens .................... 707/3 |
| 5,768,381 A | 6/1998 | Hawthorne .............. 380/21 |
| 5,799,088 A | 8/1998 | Raike ...................... 380/30 |
| 5,862,323 A | 1/1999 | Blakley, III et al. .... 395/188.01 |
| 5,864,843 A | 1/1999 | Carino, Jr. et al. ...... 707/4 |
| 5,944,824 A | 8/1999 | He .......................... 713/201 |
| 5,956,400 A | 9/1999 | Chaum et al. ........... 380/4 |
| 6,047,072 A | 4/2000 | Field et al. .............. 380/283 |
| 6,088,699 A | 7/2000 | Gampper et al. ........ 707/10 |
| 6,088,700 A | 7/2000 | Larsen et al. ............ 707/10 |
| 6,233,338 B1 * | 5/2001 | Leppek .................... 380/28 |
| 6,571,337 B1 * | 5/2003 | Xiao ........................ 713/194 |

OTHER PUBLICATIONS

Kaplan, IBM Cryptolopes TM, SuperDistribution and Digital Rights Management, Dec. 30, 1996, pp. 1–10.*

Schneier, Applied Cryptography, 1996, John Wiley and Sons., 2nd Edition, p. 519.*

"Introduction to Kerberos 5," National Center for Supercomputing Applications, http://www.ncsa.uiuc.edu pp. 107, Oct. 27, 1998.

* cited by examiner

Primary Examiner—Kim Vu
Assistant Examiner—Paula Klimach
(74) Attorney, Agent, or Firm—Thomas, Kayden, Horstemeyer & Risley, L.L.P.

(57) ABSTRACT

Data messages transmitted between computers are encrypted to provide a high level of security, yet the throughput of the encrypted data is minimally affected. In this regard, a first computer encrypts a data portion of a message via a first encryption technique before transmitting the message to a second computer. The first computer also includes information associated with the first encryption technique in a header of the message and encrypts the header via a second encryption technique, which preferably is a highly secure encryption technique. The second computer receives the data message and decrypts the header. The second computer then utilizes the information in the header that is associated with the first encryption technique to decrypt the data portion.

35 Claims, 7 Drawing Sheets

SYSTEM AND METHOD FOR ENCRYPTING DATA MESSAGES

BACKGROUND OF THE INVENTION

1. Field of the Invention

The present invention generally relates to encryption techniques and, in particular, to a system and method for encrypting data communicated between two computers remotely located from each other.

2. Related Art

With the introduction of the Internet and other technological advances, computers now have the capability of communicating across vast distances. However, communication over vast distances presents certain security issues in some applications that utilize sensitive or private information. In this regard, it is often difficult to prevent an unauthorized user, sometimes referred to as a "hacker," from gaining access to a portion of a data path connecting two computers that are remotely located from each other. Therefore, it is possible for a hacker to intercept at least some of the messages communicated during a data session between the two computers.

As a result, encryption techniques have been developed to prevent hackers from deciphering messages that have been intercepted. Most encryption techniques utilize a key or keys that translate (i.e., encrypt) the data of a message into an unrecognizable form before transmission. The intended recipient at some point is provided with a key or keys that may be used to translate (i.e., decrypt) the unrecognizable message into a recognizable form so that the message can be read and processed by the recipient. Therefore, even if a hacker intercepts a message, the hacker should be unable to read the message, because the hacker should not have the key or keys needed to properly decrypt the message.

However, not all encryption techniques afford the same quality of protection from hackers. In this regard, it is possible for some hackers to determine (i.e., "break") the algorithm used to encrypt an intercepted message and, therefore, to decipher the contents of the intercepted message. Some encryption techniques utilize a more complex encryption scheme, which is generally more difficult to break than a less complex encryption scheme. However, more complex encryption schemes generally take longer to encrypt and decrypt and, therefore, reduce the throughput for the data session.

For example, two commonly used encryption techniques are data encryption standard (DES) and Rivest-Shamir-Adleman (RSA) encryption. RSA encryption is usually more difficult to break than DES encryption, but RSA encryption causes a significant reduction in throughput as compared to DES encryption. Accordingly, in applications in which large amounts of data need to be transmitted, DES encryption is often selected over RSA encryption, even though DES encryption is viewed by many as a less secure encryption technique.

Thus, a heretofore unaddressed need exists in the industry for a highly secure encryption scheme that minimally impacts throughput.

SUMMARY OF THE INVENTION

The present invention overcomes the inadequacies and deficiencies of the prior art as discussed herein. In general, the present invention provides a system and method for encrypting data communicated between two computers. The encryption scheme used to encrypt the data provides a high degree of security without a relatively significant effect to throughput.

In accordance with the present invention a first computer encrypts a data portion of a message via a first encryption technique before transmitting the message to a second computer. The first computer also includes information associated with the first encryption technique in a header of the message and encrypts the header via a second encryption technique. The second computer receives the data message and decrypts the header. The second computer then utilizes the information in the header that is associated with the first encryption technique to decrypt the data portion.

In accordance with another feature of the present invention, the information associated with the first encryption technique identifies the first encryption technique and/or identifies an encryption key used to encrypt the data portion. It is possible for either the first encryption technique and/or the encryption key to be randomly selected by the first computer.

The present invention can also be viewed as providing a method for transmitting messages between computers. The method can be broadly conceptualized by the following steps: defining a data portion of a first data message; encrypting the data portion of the first data message via a first encryption technique; defining a header of the first data message, the header of the first data message including information associated with the first encryption technique; encrypting the header of the first data message via a second encryption technique; and transmitting the first data message subsequent to the encrypting steps.

Other features and advantages of the present invention will become apparent to one skilled in the art upon examination of the following detailed description, when read in conjunction with the accompanying drawings. It is intended that all such features and advantages be included herein within the scope of the present invention, as is defined by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE INVENTION

Figure 1:
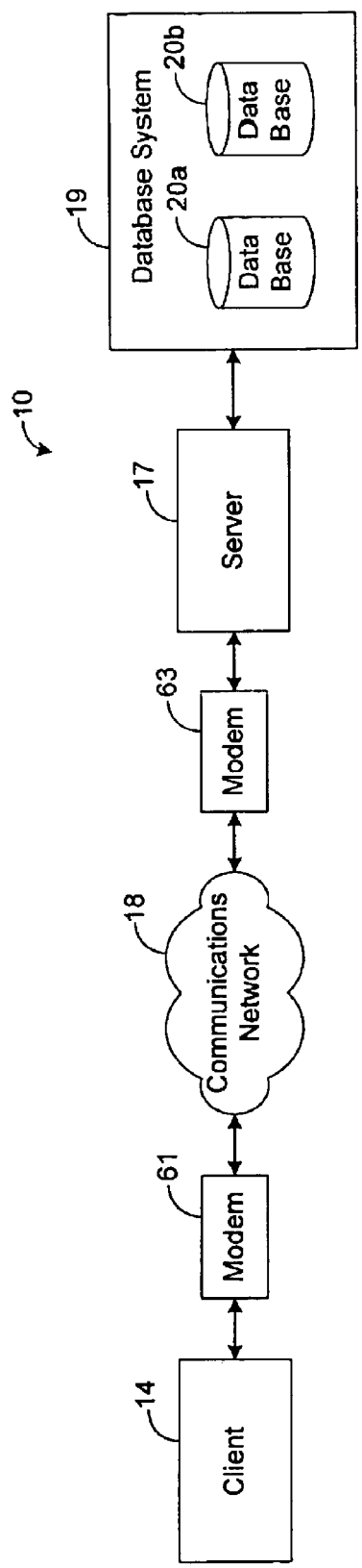
FIG. 1 is a block diagram illustrating a communication system in accordance with the present invention.

FIG. 1 depicts a communication system 10 illustrating the principles of the present invention. Referring to FIG. 1, a client 14 is configured to communicate with a server 17 via communications network 18. The client 14 is preferably a computer system located remotely from the server 17, which is preferably a computer system as well. As used herein, the terms "remotely located" or "remote location" shall refer to a location separated from the premises of a server 17 by an unsecure connection. An unsecure connection is any connection accessible by a hacker or unauthorized user. Examples of unsecure connections are, but are not limited to, Internet connections, publicly switched telephone network (PSTN) connections, cellular connections etc. The communications network 18 can comprise any conventional communications network or combinations of networks such as, for example (but not limited to), the PSTN, a cellular network, etc. Furthermore, the communications network 18, along with the client 14 and server 17, may employ any protocol or combinations of protocols suitable for communicating information between the client 14 and the server 17.

The server 17 is preferably associated with and connected to a database system 19 having at least one database 20a or 20b. The database system 19 is preferably located on a premises of the server 17, and information stored within each database 20a and 20b can be accessed by the server 17 through known techniques. Copending U.S. patent application entitled "System and Method for Encrypting a Data Session Between a Client and a Server," assigned Ser. No. 09/146,264, and filed on Sept. 3, 1998, which is incorporated herein by reference, describes techniques that may be employed by server 17 to retrieve data from database system 19.

Figure 2:
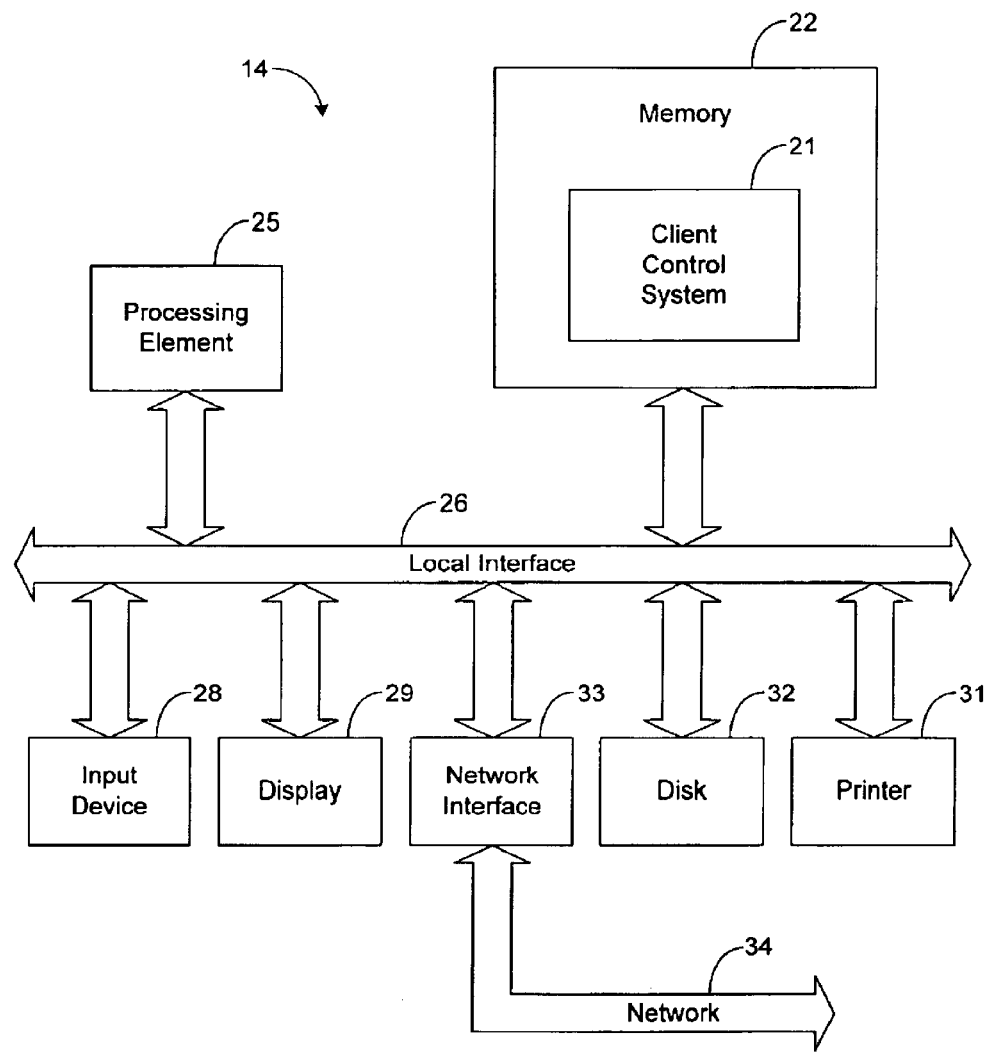
FIG. 2 is a block diagram illustrating a client computer system depicted in FIG. 1.

Referring now to FIG. 2, the client 14 preferably includes a control system 21 for controlling the operation of the client 14. The client control system 21 can be implemented in hardware, software, or a combination thereof. In the preferred embodiment, the client control system 21 along with its associated methodology is preferably implemented in software and stored in memory 22 of the client 14. Note that the client control system 21 can be stored and transported on any computer-readable medium for use by or in connection with a computer-readable system or method. In the context of this document, a computer, readable medium is an electronic, magnetic, optical, or other physical device or means that can contain or store a computer program for use by or in connection with a computer-related system or method. As an example, the client control system 21 may be magnetically stored and transported on a conventional portable computer diskette.

The preferred embodiment of the client 14 of FIG. 2 comprises one or more conventional processing elements 25, such as a digital signal processor (DSP), that communicate to and drive the other elements within the client 14 via a local interface 26, which can include one or more buses. Furthermore, an input device 28, for example, a keyboard or a mouse, can be used to input data from a user of the client 14, and a screen display 29 or a printer 31 can be used to output data to a user. A disk storage mechanism 32 can be connected to the local interface 26 to transfer data to and from a nonvolatile disk (e.g., magnetic, optical, etc.). The client 14 can be connected to a network interface 33 that allows the client 14 to exchange data with a network 34.

Figure 3:
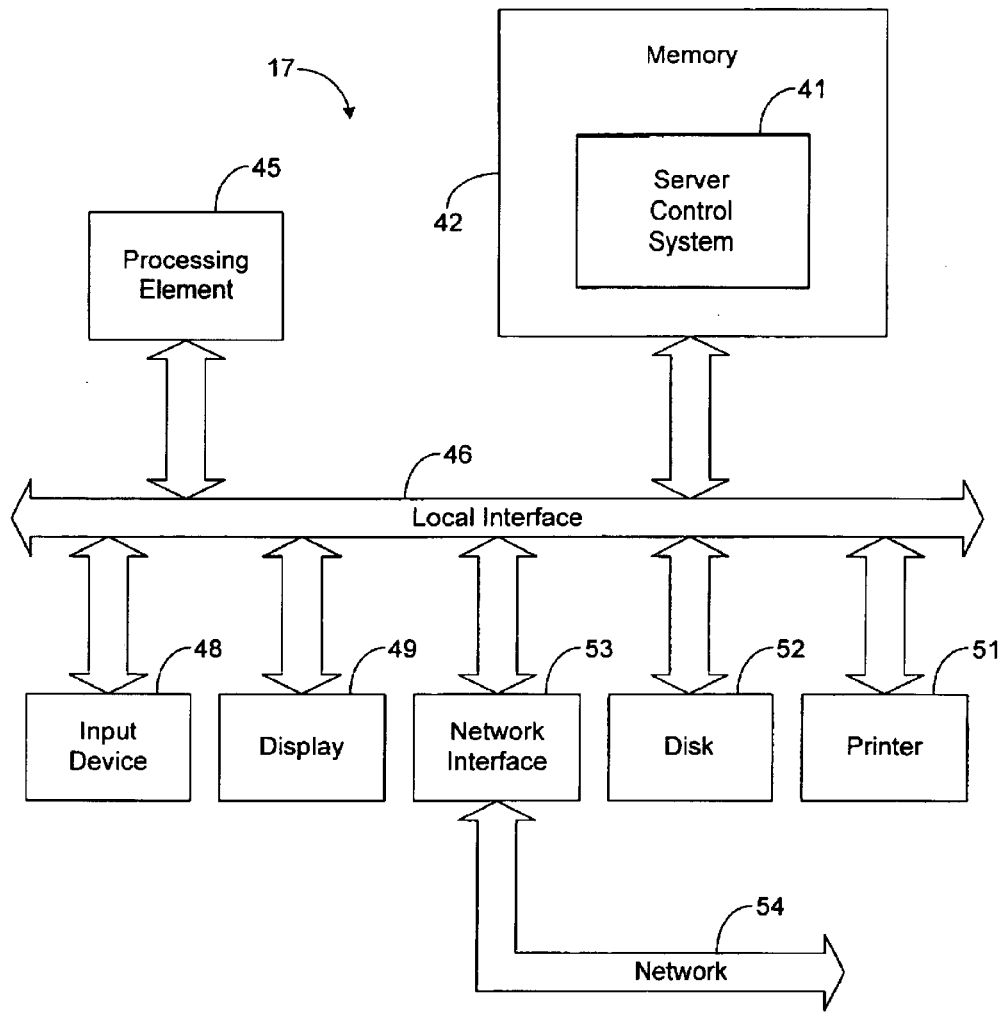
FIG. 3 is a block diagram illustrating a server computer system depicted in FIG. 1.

Furthermore, as shown by FIG. 3, the server 17 preferably comprises a computer system similar to the client 14. A control system 41 associated with the server 17 preferably controls the operations of the server 17. The server control system 41 may be implemented in hardware, software, or a combination thereof. In the preferred embodiment, the server control system 41 along with its associated methodology is preferably implemented in software and stored in memory 42 of the server 17. Note that the server control system 41 can be stored and transported on any computer-readable medium for use by or in connection with a computer-readable system or method.

Similar to the client 14, the preferred embodiment of the server 17 comprises one or more conventional processing elements 45, such as a digital signal processor (DSP), that communicate to and drive the other elements within the server 17 via a local interface 46, which can include one or more buses. Furthermore, an input device 48, for example, a keyboard or a mouse, can be used to input data from a user of the client 14, and a screen display 49 or a printer 51 can be used to output data to a user. A disk storage mechanism 52 can be connected to the local interface 46 to transfer data to and from a nonvolatile disk (e.g., magnetic, optical, etc.). The server 17 can be connected to a network interface 53 that allows the server 17 to exchange data with a network 54.

Referring again to FIG. 1, the client 14 is configured to establish communication with the server 17 through any suitable technique known in the art. For example, the client 14 can be connected to a modem 61 which establishes communication with a modem 63 connected to the server 17. Once communication between the modems 61 and 63 is established, the client 14 can communicate with the server 17 via communications network 18 and modems 61 and 63. However, one skilled in the art should realize that communication devices other than modems 61 and 63 may be used to establish communication between client 14 and server 17.

After a data connection is established between the client 14 and the server 17, the client 14 and the server 17 are configured to establish a first type of encryption scheme, such as the well-known Diffie-Hellman encryption scheme, for example, although other types of encryption schemes may be established. In this regard, the server 17 is configured to generate Diffie-Hellman parameters and to transmit the Diffie-Hellman parameters to the client 14. The client 14, through well known techniques, is designed to generate a public key (hereinafter referred to as "the client's Diffie-Hellman public key ") based on the received Diffie-Hellman parameters. The client 14 then transmits this public key to the server 17, which is configured to utilize the client's Diffie-Hellman public key and the Diffie-Hellman parameters to generate a public key (hereinafter referred to as "the server's Diffie-Hellman public key ") and a Diffie-Hellman key, which can be utilized in conjunction with a Diffie-Hellman public key to decrypt data.

After generating the server's Diffie-Hellman public key, the server 17 is configured to transmit the servers Diffie-Hellman public key to the client 14. Based on the server's Diffie-Hellman public key and the Diffie-Hellman parameters previously transmitted to the client 14, the client 14 is designed to discover the Diffie-Hellman key. Therefore, at this point, both the client 14 and the server 17 are aware of the Diffie-Hellman key that is to be used for the data session and are aware of the server's Diffie-Hellman public key and the client's Diffie-Hellman public key. As a result, the client 14 and the server 17 may encrypt and decrypt data communicated therebetween via conventional Diffie-Hellman encryption techniques.

In the preferred embodiment, both the client 14 and the server 17 are respectively associated with a pair of public and private keys that may be used to encrypt and decrypt data according to conventional public/private key pair encryption techniques, such as Rivest-Shamir-Adleman (RSA), for example. In this regard, the client 14 is configured to transmit the client's RSA public key to the server 17, and the server 17 is configured to transmit the server's RSA public key to the client 14. To enhance security of the data communicated by the system 10, both the client's RSA public key and the server's RSA public key are encrypted via Diffie-Hellman encryption techniques before transmission. Once the server 17 has received and decrypted the client's RSA public key and the client 14 has received and decrypted the server's RSA public key, the client 14 and the server 17 may encrypt and decrypt future messages according to RSA encryption techniques.

After exchanging the RSA public keys, the client 14 and the server 17 preferably encrypt all messages transmitted therebetween via RSA encryption techniques. However, RSA encryption techniques typically slow data transfer considerably, and completely encrypting each of the messages communicated between the client 14 and the server 17 via RSA encryption techniques or other types of highly secure encryption techniques may significantly decrease the throughput of the system 10. Therefore, instead of completely encrypting each message via RSA encryption techniques, the client 14 and the server 17 are configured to encrypt only a portion of each message via RSA encryption techniques (or another type of high security encryption technique) and to encrypt the remaining portion of each message with a faster type of encryption technique.

Figure 4:
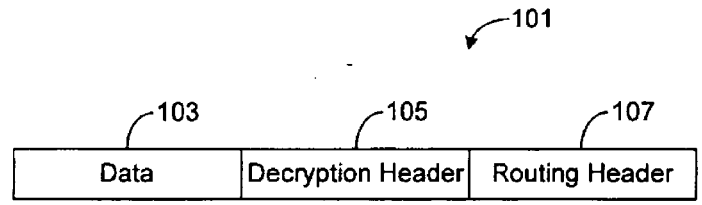
FIG. 4 is a block diagram illustrating an exemplary data message that may be transmitted by the communication system depicted in FIG. 1.

FIG. 4 shows an exemplary data message 101 that is communicated between client 14 and server 17. In the preferred embodiment, the message 101 is a data packet in accordance with transmission control protocol/internet protocol (TCP/IP) so that the message may be communicated via the Internet or other types of networks that utilize TCP/IP. However, the message 101 may be compatible with other types of protocols in other embodiments.

The message 101 includes a data portion 103, a decryption header 105, and a routing header 107. The routing header 107 includes routing information, such as a destination address, for example, required by the network 18 (FIG. 1) to route the message 101 to the intended recipient (e.g., either client 14 or server 17). Therefore, the routing header 107 should be unencrypted to allow components of the network 18 to read and understand the routing information within the routing header 107.

The data portion 103 includes data that is to be received and processed by either the client 14 or server 17 through conventional techniques. For example, the data portion 103 may include data defining a request to retrieve data or may include data that has been retrieved in response to a request to retrieve data. The data portion 103 is preferably encrypted via any conventional encryption technique. For example, the data portion 103 may be encrypted via well-known data encryption standard (DES) techniques, which utilize the same encryption key to encrypt and decrypt data. However, other types of encryption techniques may be used to encrypt the data portion 103 in other embodiments.

To increase the security of the messages 101, each data portion 103 is preferably encrypted with a randomly selected encryption technique or with a randomly selected encryption key. Furthermore, the decryption header 105 preferably includes sufficient data to enable the recipient (e.g., client 14 or server 17) of the message 101 to decrypt the data portion 103. For example, when the data portion 103 has been encrypted via DES encryption techniques, as described above, the decryption header 105 preferably includes information indicating that DES encryption techniques have been used to encrypt the data portion 103 and preferably includes the DES key used to encrypt the data portion 103. As a result, the recipient of the message 101 is able to decrypt the data portion 103 using the information included in the decryption header 105.

To ensure that an unauthorized user cannot use the information in decryption header 105 to decrypt the data portion 103 in the event that the message 101 is intercepted by an unauthorized user, the decryption header 105 is preferably encrypted via a different and preferably more secure encryption technique, such as RSA encryption, for example. Therefore, upon receiving the message 101, the recipient of the message 101 is configured to decrypt the decryption header 105 via RSA encryption techniques, and based upon the information decrypted from the decryption header 105, the recipient is configured to decrypt the data portion 103.

It should be noted that because the decryption header 105 of message 101 includes sufficient data for the recipient to decrypt the data portion 103, the encryption technique and/or the encryption key used to encrypt the data portion 103 of different messages 101 transmitted by client 14 and/or server 17 may be changed for each message 101 communicated during the data session. For example, the client 14 or server 17 may encrypt the data portion 103 of each message respectively transmitted by the client 14 or server 17 in the data session with a randomly selected encryption key, such that the data portions 103 of different messages 101 are encrypted with different encryption keys. Also, the client 14 or server 17 may encrypt the data portion 103 of each message 101 respectively transmitted by the client 14 or server 17 via a randomly selected encryption technique, such that the encryption techniques used to encrypt the data portions 103 of different messages 101 changes during the data session.

As a result, if an unauthorized user intercepts the messages 101 of the data session and is able to decipher the data portion 103 of one of the messages 101, the data portions 103 of the other methods should still be secure. In other words, breaking the encryption of the data portion 103 of one of the messages 101 does not enable an unauthorized user to decipher the data portions 103 of other messages 101. Therefore, as long as the unauthorized user is unable to break the encryption scheme of the decryption header 105, which can be encrypted with a relatively strong encryption scheme, then the overall integrity of the data session should be preserved. Consequently, to maximize throughput, a user can choose to encrypt the data portion 103 with relatively fast encryption techniques over slower but more secure encryption techniques without significantly jeopardizing the security of the data transmitted by the data portions 103.

To further increase the security of the message 101, various other security features may be utilized. For example, a hash may be inserted into each data message 101 to indicate via conventional techniques whether the data within the message 101 has changed since the message was originally transmitted. In other words, the hash indicates whether the data within the message 101 has been altered by an unauthorized user. Therefore, a recipient of the message 101 may analyze the hash via conventional hashing techniques to determine whether the data has been altered by an unauthorized user. If the data has been so altered, the recipient is preferably configured to ignore the message 101.

In addition, the decryption header 105 may also include an authorization indicator to verify that the message 101 has been transmitted from a reliable source. For example, the client 14 may transmit a message 101 to the server 17 requesting the server 17 to retrieve certain data. The client 14 is preferably configured to insert an authorization indicator, which can be any number or other type of value known to the client 14. In this example, the server 17 is configured to retrieve data in response to the message 101 transmitted by the client 14 and to transmit the retrieved data to the client 14 via another message 101. The server 17 is preferably configured to insert the authorization indicator read from the request transmitted by the client 14 into the decryption header 105 of the message 101 transmitted by the server 17. Therefore, upon receiving the message 101 from the server 17, the client 14 can verify that the message 101 is from the server 17 when the client 14 locates the authorization indicator in the message 101. If the client 14 is unable to locate the authorization indicator in the message 101 received by the client 14, then the client 14 is configured to assume that the message 101 has been transmitted from an unreliable source and is configured to ignore the received message 101. It should be noted that security features other than the ones previously described may be implemented by the client 14 and/or server 17 without departing from the principles of the present invention.

OPERATION

The preferred use and operation of the communication system 10 and associated methodology are described hereafter.

Figure 5:
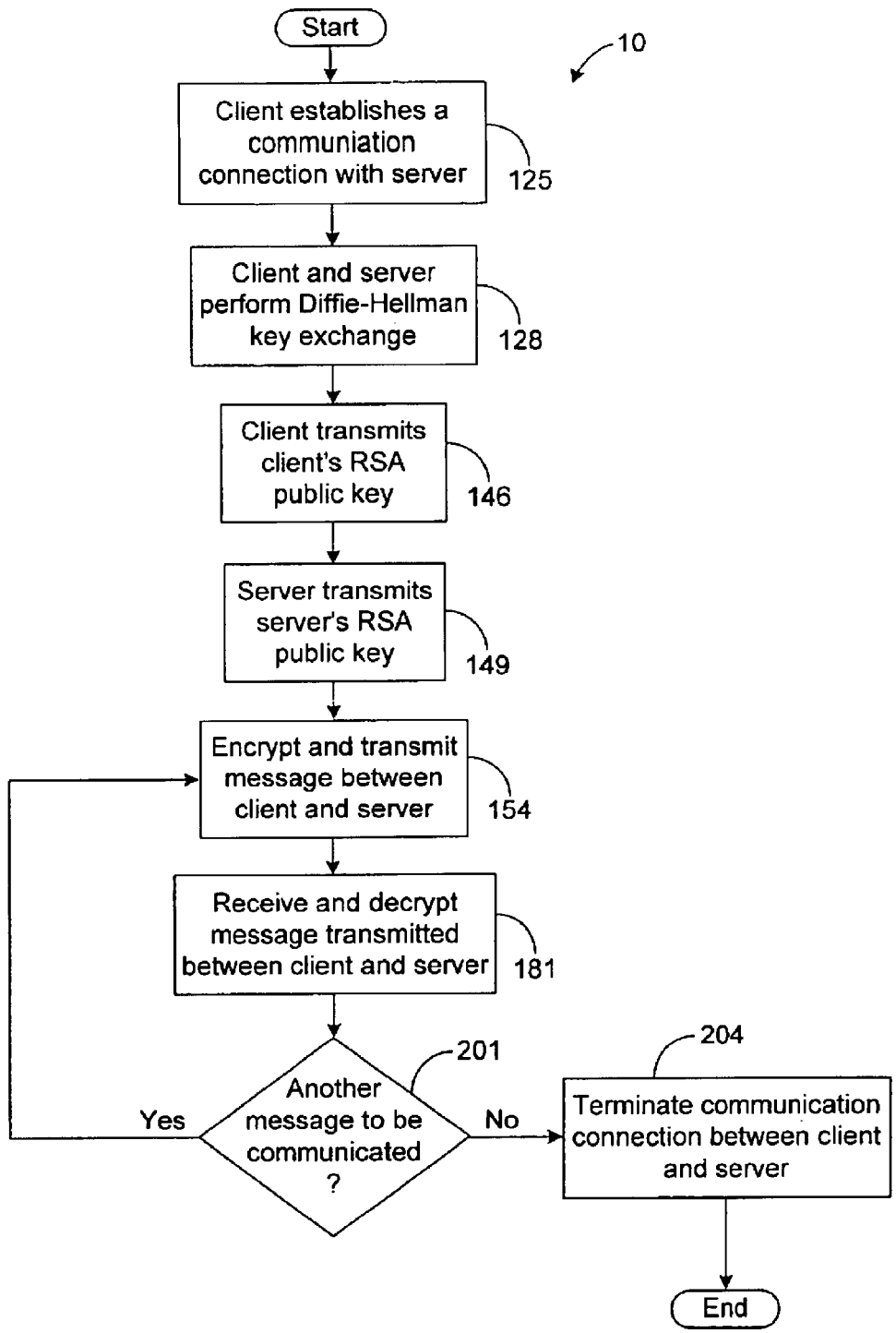
FIG. 5 is a flow chart illustrating the architecture and functionality of the communication system depicted in FIG. 1.

Initially, client 14 establishes a communication connection with server 17 via network 18 through conventional techniques, as shown by block 125 of FIG. 5. The client 14 and server 17 then use Diffie-Hellman key exchange in block 128 to obtain the client's Diffie-Hellman public key, the server's Diffie-Hellman public key, and the Diffie-Hellman key.

Figure 6:
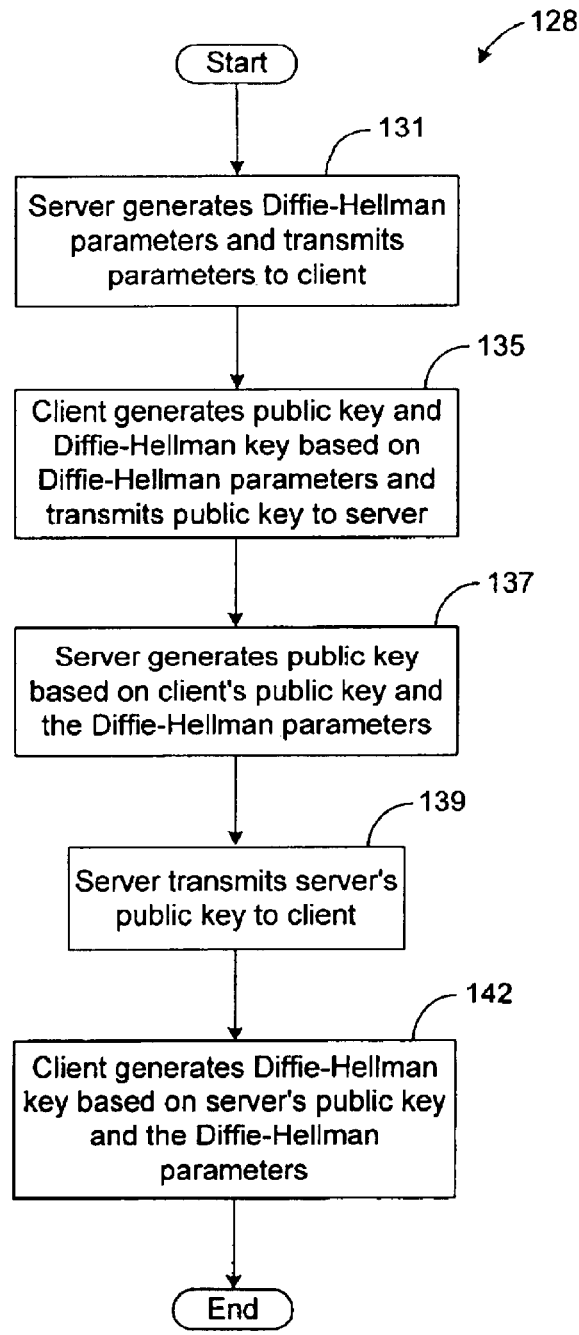
FIG. 6 is a flow chart illustrating a more detailed view of a portion of the flow chart depicted in FIG. 5.

In this regard, once the communication connection is established between the client 14 and the server 17, the server 17 generates Diffie-Hellman parameters and transmits the Diffie-Hellman parameters to client 14, as depicted by a block 131 of FIG. 6. Through conventional techniques, the client 14 generates the client's Diffie-Hellman public key based on the Diffie-Hellman parameters transmitted from the server 17. As shown by block 135, the client 14 transmits the client's Diffie-Hellman public key to the server 17. The server 17 uses this public key along with the Diffie-Hellman parameters generated in block 131 to generate the server's Diffie-Hellman public key, as depicted by block 137. The server 17 then transmits the server's Diffie-Hellman public key to the client 14 in block 139. As shown by block 142, the client 14 generates the Diffie-Hellman key based on the server's Diffie-Hellman public key and based on the Diffie-Hellman parameters transmitted in block 131. Note that the Diffie-Hellman key generated in block 142 should match the Diffie-Hellman key generated in block 131.

After performing block 128, both the client 14 and the server 17 should have sufficient information to perform conventional Diffie-Hellman encryption and decryption. Referring again to FIG. 5, the client 14 preferably encrypts the client's RSA public key via Diffie-Hellman encryption and transmits this key to the server 17 in block 146. Likewise, the server 17 preferably encrypts the server's RSA public key via Diffie-Hellman encryption and transmits this key to the client 14, as shown by block 149. After performing block 149, the client 14 and the server 17 should have sufficient information for performing RSA encryption and decryption.

Assume for illustrative purposes, that the client 14 is to transmit a retrieval request (i.e., a request to retrieve data) to server 17. In this example, the client 14 inserts the data defining the retrieval request into the data portion 103 of a message 101 and encrypts the data portion 103 before transmitting the message 101 to server 17, as shown by block 154.

Figure 7:
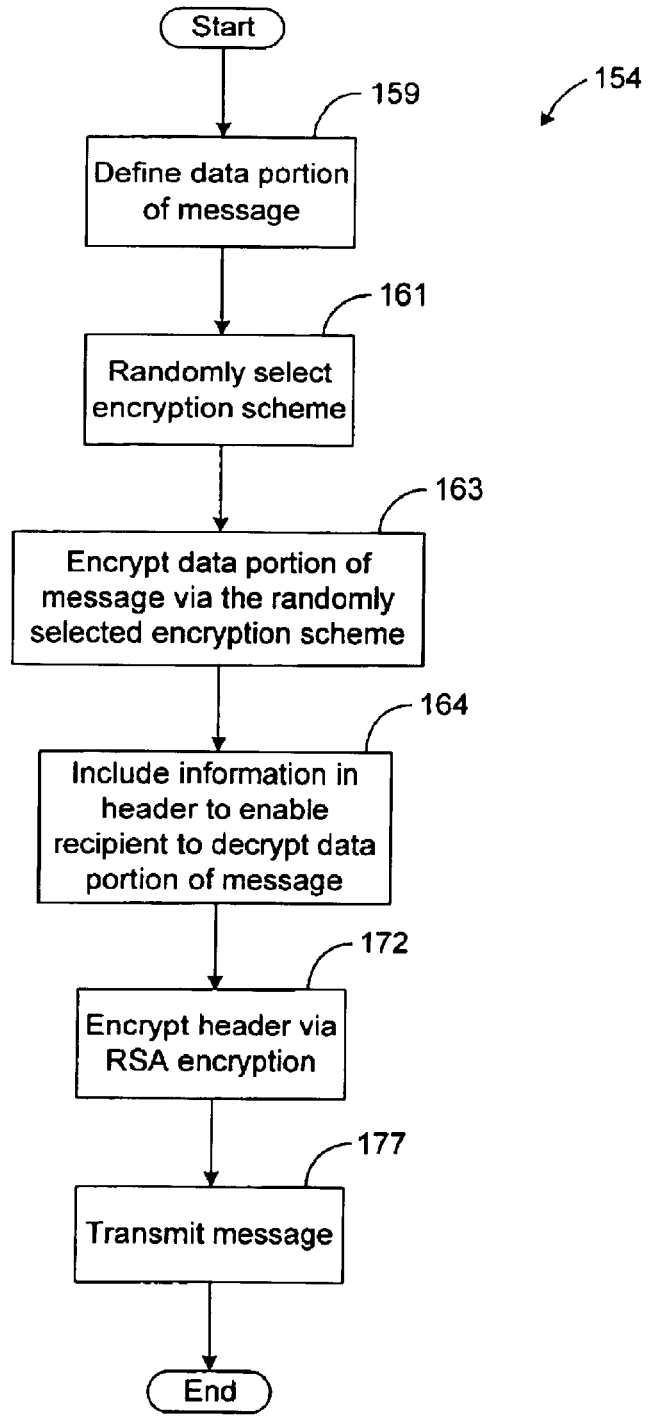
FIG. 7 is a flow chart illustrating a more detailed view of another portion of the flow chart depicted in FIG. 5.

In performing block 154, the client 14 defines the data portion 103 of a message 101 with the retrieval request, as depicted by block 159 of FIG. 7. In other words, the client 14 includes data in the data portion 103 that defines the retrieval request. The client 14 then randomly selects an encryption scheme and encrypts the data portion 103 with the selected encryption scheme, as shown by blocks 161 and 163 of FIG. 7. The encryption scheme selected by the client 14 in block 161 should be compatible with server 17. In other words, the server 17 should be familiar with the encryption scheme so that the server 17 can decrypt the message 101.

To ensure that the server 17 is compatible with the selected encryption scheme, the server 17 (prior to block 161) preferably transmits a list of encryption schemes that the client 14 may choose from. For example, the server 17 may transmit this list to the client 14 in block 131 (FIG. 6) along with the Diffie-Hellman parameters. The list transmitted by the server 17 may also include limitations or other information associated with the encryption schemes in the list. For example, the list may include data indicating the maximum length of an encryption key that may be used to encrypt data. Moreover, the client 14 should be aware of which encryption schemes are compatible with server 17 and can select any encryption scheme compatible with server 17 in block 161 of FIG. 7.

In selecting the encryption scheme in block 161, the client 14 may also randomly select an encryption key with which to encrypt the retrieval request according to the selected encryption schemes. Furthermore, as shown by block 164, the client 14 includes information in the decryption header 105 that enables the server 17 to decrypt the data portion 103, which is encrypted according to the encryption scheme selected in block 161. For example, in the preferred embodiment, the client 14 includes information in the decryption header 105 indicating which type of encryption scheme and which encryption key was selected in block 161. However, in other embodiments, other types of information may be included in the decryption header 105 to enable the server 17 to decrypt the data portion 103.

After defining the decryption header 105, the client 14 (as shown by block 172) encrypts the decryption header 105 via RSA encryption (i.e., utilizing the server's RSA public key transmitted to the client 14 in block 149). Then, in block 177, the client 14 transmits the encrypted message 101 to the server 17.

Figure 8:
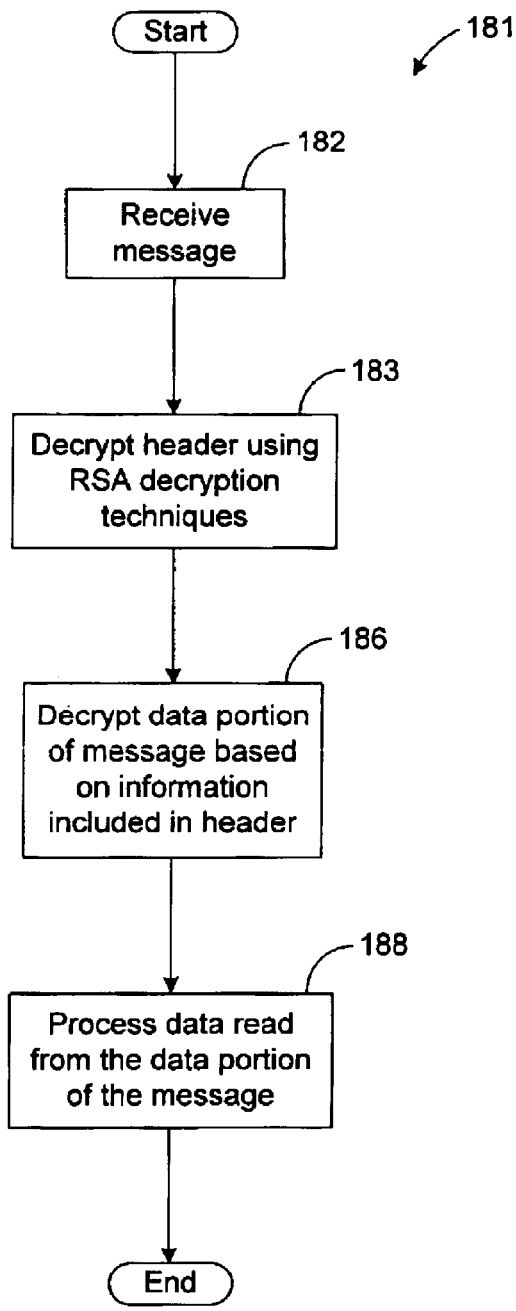
FIG. 8 is a flow chart illustrating a more detailed view of another portion of the flow chart depicted in FIG. 5.

In block 181 of FIG. 5, the server 17 receives and decrypts the message 101 transmitted by the client 14 in block 154. Referring to FIG. 8, the server 17 receives the message 101 in block 182 and, as shown by block 183, decrypts the decryption header 105 using RSA decryption (i.e., utilizing the client's RSA public key transmitted to the server 17 and block 146). Based on the information contained in the decryption header 105, the server 17 determines which encryption scheme and which encryption key was used by the client 14 to encrypt the data in data portion 103. Therefore, by reading the decryption header 105, the server 17 should have sufficient information to decrypt the data portion 103. Accordingly, the server 17 decrypts the data portion 103 in block 186 and reads the retrieval request included in the data portion 103. The server 17 then processes the retrieval request according to conventional techniques.

In this regard, the server 17 retrieves data from the database system 19 in response to the retrieval request. As shown by block 201 of FIG. 5, blocks 154 and 181 are repeated for each data message transmitted between client 14 in server 17. Therefore, the server 17 performs blocks 154 and 181 to transmit the data retrieved from database system 19. However, because the encryption scheme and the encryption key is randomly selected in block 161 (FIG. 7), it is not likely that the server 17 will encrypt the message 101 transmitted to client 14 with the same encryption scheme and/or encryption key used by the client 14 in encrypting the retrieval request.

To ensure that the client 14 can read the message 101 transmitted by the server 17, the server 17 preferably selects an encryption scheme in block 161 (FIG. 7) that is compatible with the client 14. Therefore, the server 17 preferably maintains a list of encryption schemes used by client 14 in transmitting messages 101 to server 17. The server 17 in block 161 only selects encryption schemes from this list maintained by the server 17. As a result, the server 17 should only encrypt messages 101 with encryption schemes compatible with the client 14.

If desired, other messages 101 may be transmitted between the client 14 and server 17. For each message 101 transmitted, blocks 154 and 181 are performed by the transmitting device (i.e., either client 14 or server 17). As a result, the encryption key used to encrypt the data portion 103 of the messages 101 changes during the data session. Therefore, a fast type of encryption may be used to encrypt the data portion 103 without significantly jeopardizing the security of the data in the data portion 103. In this regard, even if the encryption of the data portion 103 of one of the messages 101 is broken by a hacker, the security of the other messages 101 is not jeopardized, since the data portions 103 of the other messages 101 are encrypted with different encryption techniques and/or encryption keys. The security of each of the messages 101 is compromised only if the encryption of the decryption header 105 is broken. Therefore, by encrypting the decryption header 105 with a relatively secure encryption technique, the security level of the messages 101 can be maximized without significantly affecting the transmission speed of the messages 101. Once each message 101 of a data session has been communicated, the connection between client 14 and server 17 can be terminated, as shown by block 204.

It should be noted that RSA and DES encryption have been described hereinabove for the purposes of illustration only. Encryption schemes other than those described herein may be used to encrypt the decryption header 105 and/or the data portion 103 without departing from the principles of the present invention.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principals of the invention. All such modifications and variations are intended to be included herein within the scope of the present invention and protected by the claims.

What is claimed is:

1. A system for securely transmitting data messages, comprising:

a first computer configured to transmit a data message, said data message having a header and a data portion, said first computer configured to encrypt said data portion via a first encryption technique and to encrypt said header via a second encryption technique, said first computer further configured to include information associated with said first encryption technique in said header; and a second computer configured to receive said first data message and to decrypt said header, said second computer further configured to decrypt said data portion based on said information included in said header.

2. The system of claim 1, wherein said information associated with said first encryption technique identifies said second encryption technique.

3. The system of claim 1, wherein said second encryption technique includes RSA encryption.

4. The system of claim 3, wherein said first encryption technique includes DES encryption.

5. The system of claim 1, wherein said first computer transmits a public key to said second computer, and wherein said second computer utilizes said public key to decrypt said header.

6. The system of claim 5, wherein said first computer is configured to encrypt said public key before transmitting said public key to said second computer.

7. The system of claim 1, wherein said information associated with said first encryption technique identifies an encryption key used by said first computer to encrypt said data portion.

8. The system of claim 7, wherein said first computer randomly selects said encryption key.

9. The system of claim 1, wherein said second computer is configured to transmit a list of encryption techniques to said first computer and said first computer is configured to select said first encryption technique from said list.

10. The system of claim 9, wherein said first computer randomly selects said first encryption technique from said list.

11. The system of claim 1, wherein said information identifies a key stored at said second computer, and wherein said second computer is configured to select said key based on said information and to use said key to decrypt said data portion.

12. The system of claim 1, wherein said data message comprises a single data packet, wherein said data portion and said header are contained in said data packet.

13. The system of claim 1, wherein said information included in said header comprises decryption instructions for decrypting said data portion.

14. The system of claim 1, wherein said information included in said header comprises a key corresponding to said first encryption technique and decryption instructions for decrypting the data portion.

15. The system of claim 1, wherein said header comprises an encrypted key and said second computer is configured to decrypt said header based on said first encryption technique in order to retrieve said key, said second computer further configured to decrypt said data portion using said key.

16. A system for transmitting messages, comprising:

means for defining a data portion of a data message;

means for encrypting said data portion via a first encryption technique;

means for defining a header of said data message, said header including information associated with said first encryption technique;

means for encrypting said header via a second encryption technique;

means for transmitting said message;

means for receiving said message at a client that is remotely located from said transmitting means;

means for decrypting said header at said client; and means for decrypting said data portion at said client based on said information in said header associated with said first encryption technique.

17. A method for transmitting messages, comprising the steps of:
  defining a data portion of a first data message;
  encrypting said data portion of said first data message via a first encryption technique;
  defining a header of said first data message, said header of said first data message including information associated with said first encryption technique;
  encrypting said header of said first data message via a second encryption technique;
  transmitting said first data message subsequent to said encrypting steps
  receiving said first data message at a client that is remotely located from said transmitting means;
  decrypting said header at said client;
  decrypting said data portion at said client based on said information in said header associated with said first encryption technique.

18. The method of claim 17, further comprising the steps of:
  receiving a list of encryption techniques; and
  randomly selecting said first encryption technique from said list.

19. The method of claim 17, wherein said first encryption technique includes RSA encryption.

20. The method of claim 19, wherein said second encryption technique includes DES encryption.

21. The method of claim 17, wherein said encrypting said data portion step includes the step of encrypting said data portion of said first data message with an encryption key, said method further comprising the step of including said encryption key in said header of said first data message.

22. The method of claim 21, further comprising the step of randomly selecting said encryption key.

23. The method of claim 21, further comprising the step of identifying said first encryption technique via information included in said header of said first data message.

24. The method of claim 21, farther comprising the steps of:
  transmitting a public key; and
  decrypting said header of said first data message based on said public key.

25. The method of claim 24, farther comprising the step of encrypting said public key before said transmitting a public key step.

26. The method of claim 21, further comprising the step of randomly selecting said first and third encryption techniques.

27. The method of claim 26, further comprising the steps of:
  receiving said second message;
  decrypting said header of said second message; and
  decrypting said data portion of said second message based on said information included in said header of said second message.

28. The method of claim 24, further comprising the steps of:
  defining a data portion of a second data message;
  encrypting said data portion of said second data message via a third encryption technique;
  defining a header of said second data message, said header of said second data message including information associated with said third encryption technique;
  encrypting said header of said second data message via said second encryption technique; and
  transmitting said second data message.

29. A method for securely communicating data messages, comprising the steps of:
  receiving at a client a data packet transmitted from a server that is remotely located from said client, said data packet having a first portion encrypted via a first encryption technique and said data packet having a second portion encrypted via a second encryption technique, said second portion comprising information associated with said first encryption technique;
  decrypting, at said client, said second portion to recover said information; and
  decrypting, at said client, said first portion based on said information.

30. A system for securely transmitting data messages, comprising:
  a first computer configured to transmit a data packet comprising a first and a second portion, said first portion encrypted by a first encryption technique and said second portion encrypted by a second technique, said second portion encrypting a public key for decrypting said first portion;
  a second computer configured to receive said data packet and decrypt said second portion to generate a public key for decrypting said first portion, said second computer further configured to decrypt said first portion with said public key.

31. The system of claim 30, wherein said first computer randomly selects a first encryption technique for encrypting said data transmitted to said second computer.

32. The system of claim 31, wherein said second computer is further configured to transmit a list of encryption techniques compatible with said second computer to said first computer.

33. A method for securely transmitting data messages, comprising the steps of:
  transmitting a data packet comprising a first and a second portion, said first portion encrypted by a first encryption technique and said second portion encrypted by a second technique, said second portion encrypting a public key for decrypting said first portion;
  receiving said data packet by a computer;
  decrypting said second portion by said computer to generate a public key for decrypting said first portion; and
  decrypting said first portion by said computer with said public key.

34. The method of claim 33, further comprising the step of randomly selecting a first encryption technique for encrypting said data transmitted to said computer.

35. The method of claim 34, further comprising the step of transmitting a list of encryption techniques compatible to said computer.

* * * * *